Figure 1:
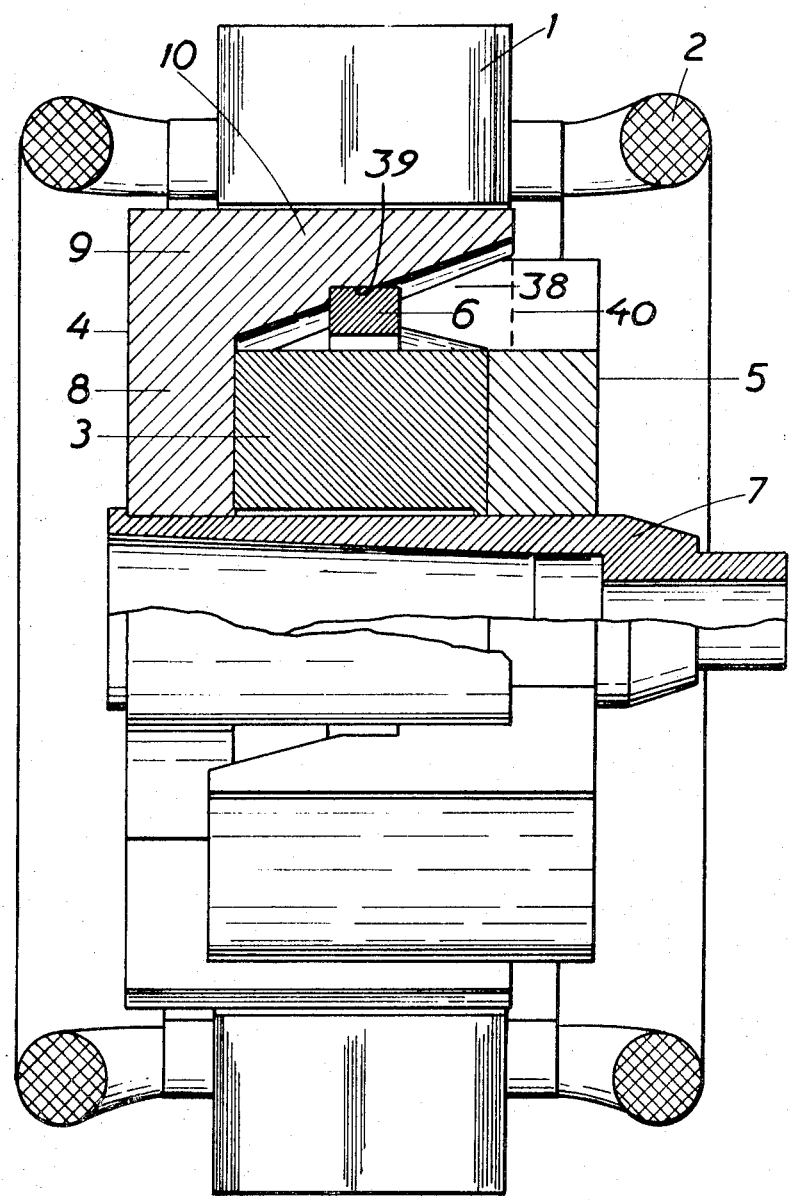

United States Patent

[11] 3,571,637

[72] Inventors Christian Johannes Henningsen;
Karl Axel Karlsson, Laxa, Sweden
[21] Appl. No. 883,445
[22] Filed Dec. 9, 1969
[45] Patented Mar. 23, 1971
[73] Assignee Elektriska Svetsningsaktiebolaget
Goteborg, Sweden

[54] PERMANENT MAGNET EXCITED ELECTRIC MACHINES
2 Claims, 3 Drawing Figs.
[52] U.S. Cl. .................................................. 310/156,
310/263
[51] Int. Cl. ................................................. H02k 1/22
[50] Field of Search ........................................ 310/156,
263, 209, 190

[56] References Cited
UNITED STATES PATENTS
| | | | |
|---|---|---|---|
| 2,579,318 | 12/1951 | Hershberger | 310/190X |
| 3,134,039 | 5/1964 | Bosch | 310/168 |
| 3,252,025 | 5/1966 | Brown et al. | 310/168 |
| 3,445,700 | 5/1969 | Prange et al. | 310/156 |
| 3,459,980 | 8/1969 | Coroller | 310/156X |

*Primary Examiner*—D. X. Sliney
*Attorney*—Cameron, Kerkam & Sutton

ABSTRACT: A dynamoelectric machine having a stator carrying the winding of the machine and a rotor comprising an annular, axially magnetized permanent magnet and a pair of pole units, each of which comprises a hub portion engaging one end face of the permanent magnet and a group of pole projections extending substantially towards the hub portion of the other pole unit, the pole projections of both pole units being equally spaced and interspaced with each other, said permanent magnet being surrounded by a sheath of nonmagnetic metallic material cast around the outer, cylindrical surface of the permanent magnet, said sheath filling the space between said pole projections and the permanent magnet as well as the spaces between the pole projections.

PERMANENT MAGNET EXCITED ELECTRIC MACHINES

This invention relates to permanent magnet excited electric machines. More particularly, the invention relates to electric machines of the kind comprising a stator, a winding carried by said stator, and a rotor, said rotor comprising a shaft, an annular, axially magnetized permanent magnet coaxially supported by said shaft, a pair of pole units, each of which comprises a hub portion engaging one end face of said annular permanent magnet and a group of pole projections extending substantially axially from the rim of said hub portion towards the other hub portion while radially spaced from said annular permanent magnet the pole projections of group extending between the pole projections of the other group.

The design above specified is simple and compact. In practice, however, the design in question has been used for very small machines only, generators for bicycle lighting being a typical application. The poor mechanical strength of the high-grade magnetic materials required for the permanent magnet is the factor principally responsible for the limitation of the size and power output of the machine.

In the improved machine according to the invention, the rotor, in addition to the members above-specified, comprises a sheath of nonmagnetic metallic material cast around the outer surface of the annular permanent magnet, said sheath filling the space between the pole projections and the permanent magnet as well as the spaces between said groups of pole projections, the resulting composite body presenting a cylindrical outer surface to the air gap of the machine. The sheath preferably consists of an aluminum alloy or a magnesium alloy, for instance an alloy of the type containing 13 percent of silicon and the remainder aluminum with or without minor additions of other metals.

The cast metal sheath girding the permanent magnet relieves the permanent magnet of centrifugal stresses caused by the rotation of the rotor, resulting in a substantial increase of the permissible size and/or rate of rotation of the rotator. The sheath also protects the permanent magnet against mechanical vibrations and increases the mechanical stability of the pole system. Electrically, the sheath forms a short-circuited turn serving as a damper winding protecting the magnet against the demagnetizing effect of transient short circuits of the stator winding. The smooth cylindrical surface of the rotor results in comparatively low ventilation losses.

Figure 2:
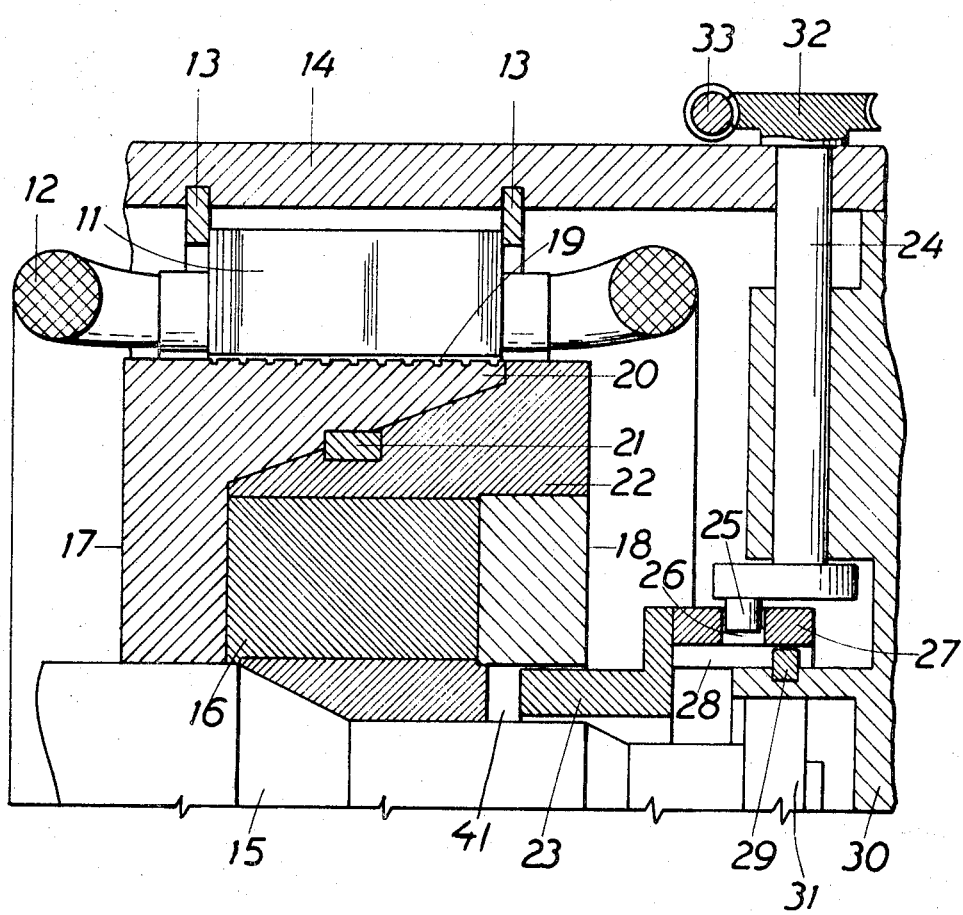
Figure 3:
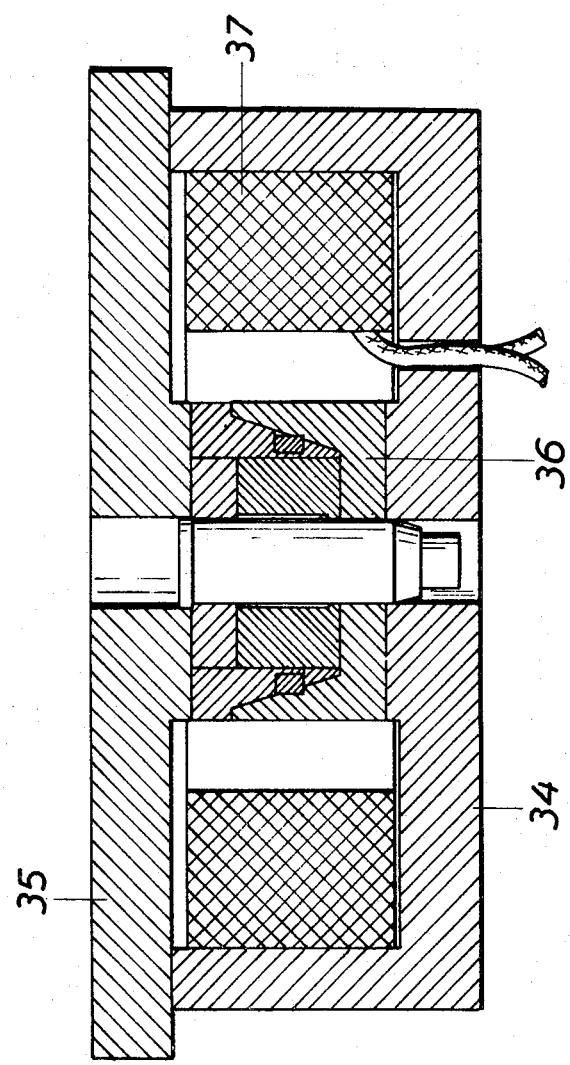

Various other features and advantages of the invention will be apparent from the following description of exemplary embodiments thereof with reference to the accompanying drawings in which:

FIG. 1 is a side view of a welding generator constituting an embodiment of the invention, the upper half being represented in sectional view, FIG. 2 is a sectional view of a welding generator having means for adjusting the output voltage, said generator constituting a second embodiment of the invention, and, FIG. 3 is a sectional view of one type of apparatus for magnetizing the rotor of a machine according to the invention prior to its insertion into the stator.

The welding generator represented in FIG. 1 has a stator core 1 consisting of thin sheets of magnetic material and provided with an eight-pole winding 2, which may be either a single-phase winding or a multiphase winding. The stator core encloses a rotor comprising an annular, cylindrical permanent magnet 3, a pair of pole units 4, 5, an annular member 6 and a rotor shaft 7 consisting of a nonmagnetic material. The stator housing and the bearing supporting the shaft 7 are not represented, being of conventional design. Each of the pole units 4, 5 comprises a hub portion 8 engaging the adjacent end face of the magnet 3 and four pole projections 20 extending substantially axially along the magnet, the base 9 of each projection forming a radial arm on the hub portion 8. The pole projections of one pole unit 4 are interspaced with the pole projections of the pole unit 5 so as to form a total of eight poles equally distributed along the circumference of the rotor. Each of the pole projections 10 is separated from the magnet 3 by a substantially V-shaped gap 38. Said gaps 38 as well as the spaces between adjacent pole projections are completely filled by a body or sheath of aluminum alloy cast around the magnet 3. For clarity's sake, the rotor is shown without said cast body, the outer boundary of which is represented by a dotted line 40. As previously explained, the primary purpose of the said aluminum alloy sheath is to take up the stresses caused by the centrifugal forces produced by the rotating mass of the magnet 3.

To ensure that the pole projections 10, or their tip portions, do not shift outwards under the combined action of the centrifugal force and the magnetic attraction of the stator, there is provided a rigid annular prestressing member 6 force fitted into a step 39 machined in each of the pole projections 10. The force fit is tight enough to maintain the projections 10 in the engagement with the annular member 6 at the highest rate of rotation occuring during operation of the machine. The fitting of the member 6 of course is made prior to the casting of the aluminum alloy sheath onto he the rotor, so that said annular member will be embedded in the metal of said sheath.

The welding generator of FIG. 2, the upper half only of which is shown, comprises a laminated stator core 11 held between two retaining rings 13 in a housing 14, said stator core carrying the winding 12 of the machine. The rotator comprises a shaft 15 of magnetic material, an annular, cylindrical permanent magnet 16, and pole units 17 and 18 comprising pole projections 20 and an annular prestressing member 21 common to all of the pole projections. The side of the pole projections which faces the stator is provided with grooves 19 serving to reduce the losses due to eddy currents. According to the invention, a sheath or block of aluminum alloy is cast around the magnet 16 so as to completely fill the V-shaped gaps between the pole projections and the magnet as well as the spaces between the pole projections the resulting composite rotor body having a smooth cylindrical outer surface (apart from the circumference grooves 19 referred to).

The diameter of the part of the shaft 15 surrounded by the hub portion of the pole unit 18 is considerably smaller than the inner diameter of said hub portion, so that there is a gap 41 of substantial width between said members. An annular magnetic member 23 extending into said gap is attached to a slide 27 guided by a pin engaging a groove 28 in the slide. The slide and the magnetic member 23 carried thereby are axially adjustable by means of a mechanism comprising a worm 33, a worm wheel 32 attached to a shaft 24 journaled in the bearing bracket 30, said bracket also supporting one bearing 31 of the rotor shaft 15, and an eccentric pin 25 on said shaft 24 engaging a transverse slot 26 in the slide 27. The device described provides control of the output voltage of the generator. For instance, displacement of the member 23 further into the gap 41 (towards the left in FIG. 2) will cause an increased portion of the total flux produced by the magnet 16 to flow through the shunt path from pole unit 18 through the member 23 and the shaft 15 to the pole unit 17, resulting in a corresponding decrease of the stator flux and the induced voltage.

The required excitation of the permanent magnet is preferably carried out prior to the insertion of the rotor into the stator. FIG. 3 shows a suitable exciting device comprising a cylindrical pot 34 and a lid 35, both of which members consist of magnetically soft iron or steel, and an exciting coil 37. When a rotor 36, which is of the design represented in FIG. 1, has been placed in position in the pot, as shown, the coil 37 is connected to a DC source, resulting in the flow of a strong magnetic flux axially through the rotor 36 and the permanent magnet forming part thereof.

The invention is particularly applicable to welding generators adapted to produce a single-phase or multiphase current having a frequency in the range between 150 and 600 p/s. In the case of multiphase generators, the welding circuit has to include a rectifier converting the multiphase current into a DC welding current, while a single-phase generator may be used either with or without a rectifier.

By way of example, a three-phase generator of the type represented in FIG. 1, combined with t three-phase rectifier, may have the following characteristics:

| | | |
|---|---|---|
| Rate of rotation | r./min | 6000 |
| Frequency | p./s | 400 |
| Open circuit voltage (rectified) | volts | 58 |
| Nominal welding current (referred to a duty cycle of 50%) | amps | 170 |
| Welding voltage (at 170 amps) | volts | 27 |
| Total weight of rotor and stator, including winding) | kgs | 12 |

A generator of this type can be driven directly by a small petrol or diesel engine, resulting in a lightweight unit which may be carried by one person.

We claim:

1. A rotary electric machine, particularly a welding generator, comprising a stator, a winding carried by said stator, and a rotor, said rotor comprising a shaft, an annular, axially magnetized permanent magnet coaxially supported by said shaft, a pair of pole units, each of which comprises a hub portion engaging one end face of said annular permanent magnet and a group of pole projections extending substantially axially from the rim of said hub portion towards the other hub portion while radially spaced from said annular permanent magnet, the pole projections of one group extending between the pole projections of the other group, a sheath of nonmagnetic metallic material cast around the outer surface of the annular permanent magnet, said sheath filling the space between said pole projections and the permanent magnet as well as the spaces between said groups of pole projections, the resulting composite body presenting a cylindrical outer surface to the air gap of the machine, and a rigid annular prestressing member of nonmagnetic material concentric with said annular permanent magnet and embedded within said sheath, said annular prestressing member being at its outer periphery force fitted into a step provided in each of said pole projections, the force fit being tight enough to maintain the engagement against the action of the centrifugal force and the magnetic force to which the pole projections are subjected during operation of the machine.

2. A rotary electric machine, particularly a welding generator, comprising a stator, a winding carried by said stator, and a rotor, said rotor comprising a shaft of a magnetic material, an annular, axially magnetized permanent magnetic coaxially supported by said shaft, a pair of pole units, each of which comprises a hub portion engaging one end face of said annular permanent magnet and a group of pole projections extending substantially axially from the rim of said hub portion towards the other hub portion while radially spaced from said annular permanent magnet, the pole projections of one group extending between the pole projections of the other group, one of said hub portions being radially spaced from said shaft to provide a radial gap, a sheath of nonmagnetic metallic material cast around the outer surface of the annular permanent magnet, said sheath filling the space between said pole projections and the permanent magnet as well as the spaces between said groups of pole projections, the resulting composite body presenting a cylindrical outer surface to the air gap of the machine, an annular magnetic member axially displaceable in said gap, and means for adjusting the axial position of said annular magnetic member.

PO-1050
(5/69)

UNITED STATES PATENT OFFICE
CERTIFICATE OF CORRECTION

Patent No.      3,571,637      Dated  March 23, 1971

Inventor(s) Christian Johannes Henningsen & Karl Axel Karlsson

It is certified that error appears in the above-identified patent and that said Letters Patent are hereby corrected as shown below:

Abstract sheet, left column, the following particulars should be inserted: --[31] 16987, [32] December 11, 1968, [3 Sweden--. Column 1, line 13, between "of" and "group" --one should be inserted; line 37, "rotator" should read --rotor-- line 69, "20" should read --10--; line 73, between "the" and "pole" --other-- should be inserted. Column 2, line 20, "he should be cancelled; line 25, "rotator" should read --rotor-- Column 3, line 2, "t" should be cancelled and --a-- should b substituted. Column 4, line 14, "magnetic" should read --magnet--.

Signed and sealed this 10th day of August 1971.

(SEAL)
Attest:

EDWARD M. FLETCHER, JR.          WILLIAM E. SCHUYLER, JR.
Attesting Officer                Commissioner of Patents